(12) United States Patent
Wertenberger

(10) Patent No.: US 7,316,329 B2
(45) Date of Patent: *Jan. 8, 2008

(54) RETURNABLE AND REUSABLE, BAG-IN-DRUM FLUID STORAGE AND DISPENSING CONTAINER SYSTEM

(75) Inventor: Richard Wertenberger, Lakeville, MN (US)

(73) Assignee: Advanced Technology Materials, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/225,409

(22) Filed: Sep. 13, 2005

(65) Prior Publication Data

US 2006/0006193 A1   Jan. 12, 2006

Related U.S. Application Data

(63) Continuation of application No. 10/761,457, filed on Jan. 20, 2004, now Pat. No. 6,942,123, which is a continuation of application No. 10/139,186, filed on May 3, 2002, now Pat. No. 6,698,619.

(51) Int. Cl.
*F17C 13/00* (2006.01)

(52) U.S. Cl. .................. 222/105; 222/107; 222/464.1; 222/394; 222/400.7

(58) Field of Classification Search ............... 222/94, 222/105, 107, 464.1
See application file for complete search history.

(56) References Cited

U.S. PATENT DOCUMENTS

| | | | |
|---|---|---|---|
| 3,945,534 A * | 3/1976 | Ady ........................... | 222/105 |
| 5,217,138 A | 6/1993 | Nichols | |
| 5,555,996 A | 9/1996 | Lang-Ree et al. | |
| 5,613,622 A * | 3/1997 | Surrena et al. ............. | 222/105 |
| 5,750,216 A | 5/1998 | Horino et al. | |
| 6,192,919 B1 * | 2/2001 | Jackson et al. ............. | 137/382 |
| 6,502,218 B1 | 12/2002 | George et al. | |
| 6,648,201 B1 * | 11/2003 | Marinaro et al. ............. | 227/95 |
| 6,698,619 B2 | 3/2004 | Wertenberger | |
| 6,942,123 B2 | 9/2005 | Wertenberger | |
| 7,153,021 B2 | 12/2006 | Goodwin et al. | |
| 2003/0004608 A1 | 1/2003 | Dougherty et al. | |
| 2003/0004808 A1 | 1/2003 | O'Dougherty et al. | |
| 2003/0102335 A1 * | 6/2003 | Barnett .................... | 222/386.5 |
| 2003/0205285 A1 | 11/2003 | Kelly et al. | |

* cited by examiner

*Primary Examiner*—J. Casimer Jacyna
(74) *Attorney, Agent, or Firm*—Vincent K. Gustafson; Intellectual Property/Technology Law; David M. Shofi

(57) ABSTRACT

A "bag-in-a-drum" container for storage and dispensing of fluids. The container is adapted to minimize volumetric space requirements in storage, transport and use of the container. The containers are usefully employed in a system of supplying liquid in containers to an end user market and refabricating containers subsequent to consumption of the liquid from the containers.

34 Claims, 6 Drawing Sheets

RETURNABLE AND REUSABLE, BAG-IN-DRUM FLUID STORAGE AND DISPENSING CONTAINER SYSTEM

CROSS-REFERENCE TO RELATED APPLICATIONS

This is a continuation of U.S. patent application Ser. No. 10/761,457 filed Jan. 20, 2004 in the name of Richard Wertenberger, issued Sep. 13, 2005 as U.S. Pat. No. 6,942,123, which in turn is a continuation of U.S. patent application Ser. No. 10/139,186 filed May 3, 2002 in the name of Richard Wertenberger, issued Mar. 2, 2004 as U.S. Pat. No. 6,698,619. The priority of said applications is claimed under the provisions of 35 USC §120.

BACKGROUND OF THE INVENTION

1. Field of the Invention

The present invention relates to a "bag-in-a-drum" container useful for storage and dispensing of fluids, which is adapted to minimize volumetric space requirements in storage, transport and use of the container. The container design in a specific embodiment includes a removable lid and liner to allow for the cost-effective return and reuse of the outer housing.

2. Description of the Related Art

In the field of semiconductor manufacturing, and in many other industrial process applications, fluid containers are employed as a source of process fluids. Such fluid containers may be fabricated and filled at remote locations from the end use facility, and are transported to the point of use by truck, rail or air transport.

At the end use facility, the containers may be stockpiled or maintained in inventory pending their introduction to the process system in which the fluid is to be utilized. The fluid-using process system may comprise fluid flow circuitry to which the container is coupled for selective dispensing of the fluid from the container to the process equipment of the system.

In semiconductor manufacturing and in numerous other fluid applications, high purity of fluid reagents is essential. In such applications, any significant fluid contamination may render the products manufactured by the fluid-consuming process deficient or even useless for their intended purpose. The containers used to supply fluids to the process systems manufacturing such products therefore must be of a character that avoids contamination issues in the process. Specifically, the container must be rigorously clean in condition. The container also must avoid "particle shedding," outgassing, and any other forms of contaminant contribution to the fluid being stored in the container from the container's fluid-contacting components. The container further must maintain the fluid prior to its use in a pure state, without degradation or decomposition of the contained fluid.

In many of the aforementioned fluid-consuming manufacturing operations, the supply, transport, storage and disposition of the fluid containers entails substantial operating costs, as well as related capital expense in the provision of tank farms, fluid vessel storage vaults, and the like. There is a corresponding need in the art to provide fluid containers that minimize these capital and operating expenses.

Except in the case of chemical-dedicated, stainless steel vessels for commodity chemicals such as tetraethylorthosilicate, high purity containers typically are not refillable or reusable due to the costs associated with the return shipment of empty containers, the costs of cleaning the used containers to a level that meets purity requirements, and operational difficulties associated with the need to chemically-dedicate or customer-dedicate refillable containers. It would therefore be a significant advance in the art, in applications in which high purity fluids are consumed, to provide fluid containers that are reusable in a cost-effective and convenient manner, and to provide an integrated supply system for repetitive use of such containers.

SUMMARY OF THE INVENTION

The present invention relates to a bag-in-a-drum fluid storage and dispensing container having a compact conformation for storage, transport and use of the container, as well as to an integrated fluid supply system utilizing containers of such type.

In one aspect, the invention relates to a bag-in-a-drum container for storage and dispensing of liquid, e.g., a high-purity liquid. The container includes a substantially rigid overpack having an interior volume, and a 3-dimensional, closed liner of a flexible film material, mounted in the interior volume and capable of being filled with liquid.

In a specific embodiment, the invention relates to a bag-in-a-drum container for storage and dispensing of high-purity liquid, including a substantially rigid overpack having an interior volume, and a 3-dimensional, closed liner of a flexible film material, mounted in the interior volume and capable of being filled with liquid. The overpack comprises a substantially rigid receptacle portion including opposedly facing front and back walls and opposedly facing side walls, and a floor member, wherein the front, back and side walls are downwardly tapered and the overpack includes an upper portion that is removable or otherwise configured to allow nested vertical stacking of at least the substantially rigid receptacle portion of the container in a vertically stacked array of corresponding containers. In one such embodiment, the receptacle portion is of a substantially rectangular parallelepiped conformation. In another such embodiment, the receptacle portion is round with tapered sidewalls to facilite nesting. In either embodiment, the receptacle portion includes a liner formed of a virgin polymeric film material having a thickness in a range of from about 0.005 inch to about 0.030 inch, and the liner has a zero headspace conformation when filled with liquid. The liner has at least one port accommodating coupling of the liner with a connector for transfer of fluid into or out of the liner, and a cap coupled with the port, with the receptacle portion being formed of a substantially rigid polymeric material.

A further aspect of the invention relates to a method of supplying liquid in containers to an end user market and refabricating containers subsequent to consumption of the liquid therefrom. The method includes the steps of:

(a) manufacturing the containers, each including an overpack and wetted components (viz., a liner for containing the liquid, having a port for transfer of fluid into or out of the liner, and a cap and diptube coupled to the port);

(b) filling the containers with liquid to provide liquid-filled containers;

(c) transporting the liquid-filled containers to end users in the end user market, where the end users use the liquid in the containers, and generate emptied containers;

(d) transporting at least the overpacks of the emptied containers to a refabrication facility, and processing same to form refabricated containers including the overpacks of the emptied containers;

(e) transporting the refabricated containers to a liquid fill facility and filling same with liquid to provide liquid-filled refabricated containers; and (f) repeating steps (c), (d) and (e) in sequence.

In such method, the end user after generating the emptied containers may remove the wetted components (e.g., the liner) and simply stack the nestable overpacks in stacked arrays for transport to the refabrication facility. Alternatively, the emptied containers may be shipped by the end user to the refabrication facility, and at such facility the wetted components (e.g., the liner) can be removed and the overpacks cleaned and inspected, followed by refabrication of the overpacks into refabricated containers, e.g., by insertion of new liners, and installation of new or recycled caps and diptubes.

Other aspects, features and embodiments of the invention will be more fully apparent from the ensuing disclosure and appended claims.

DETAILED DESCRIPTION OF THE INVENTION, AND PREFERRED EMBODIMENTS THEREOF

The disclosures of the following patent applications filed May 3, 2002, are hereby incorporated herein by reference in their respective entireties: U.S. patent application Ser. No. 10/139,185 of Wayne Kelly, et al., entitled "APPARATUS AND METHOD FOR MINIMIZING THE GENERATION OF PARTICLES IN ULTRAPURE LIQUIDS;" and U.S. patent application Ser. No. 10/139,104 of Kevin O'Dougherty, et al., entitled "LIQUID HANDLING SYSTEM WITH ELECTRONIC INFORMATION STORAGE."

The present invention in one aspect provides a fluid container of a so-called "bag-in-a-drum" type, comprising a flexible, resilient liner capable of holding liquid as the "bag" component of the container, with the liner being coupled to a generally rigid casing or housing that constitutes the "drum" component of the container.

The fluid container of the present invention may be variously fabricated with selected features from among those hereinafter more fully described, to provide a fluid storage and dispensing article that is reusable in an integrated supply system that also is discussed more fully hereinafter, as a further aspect of the invention.

Figure 1:
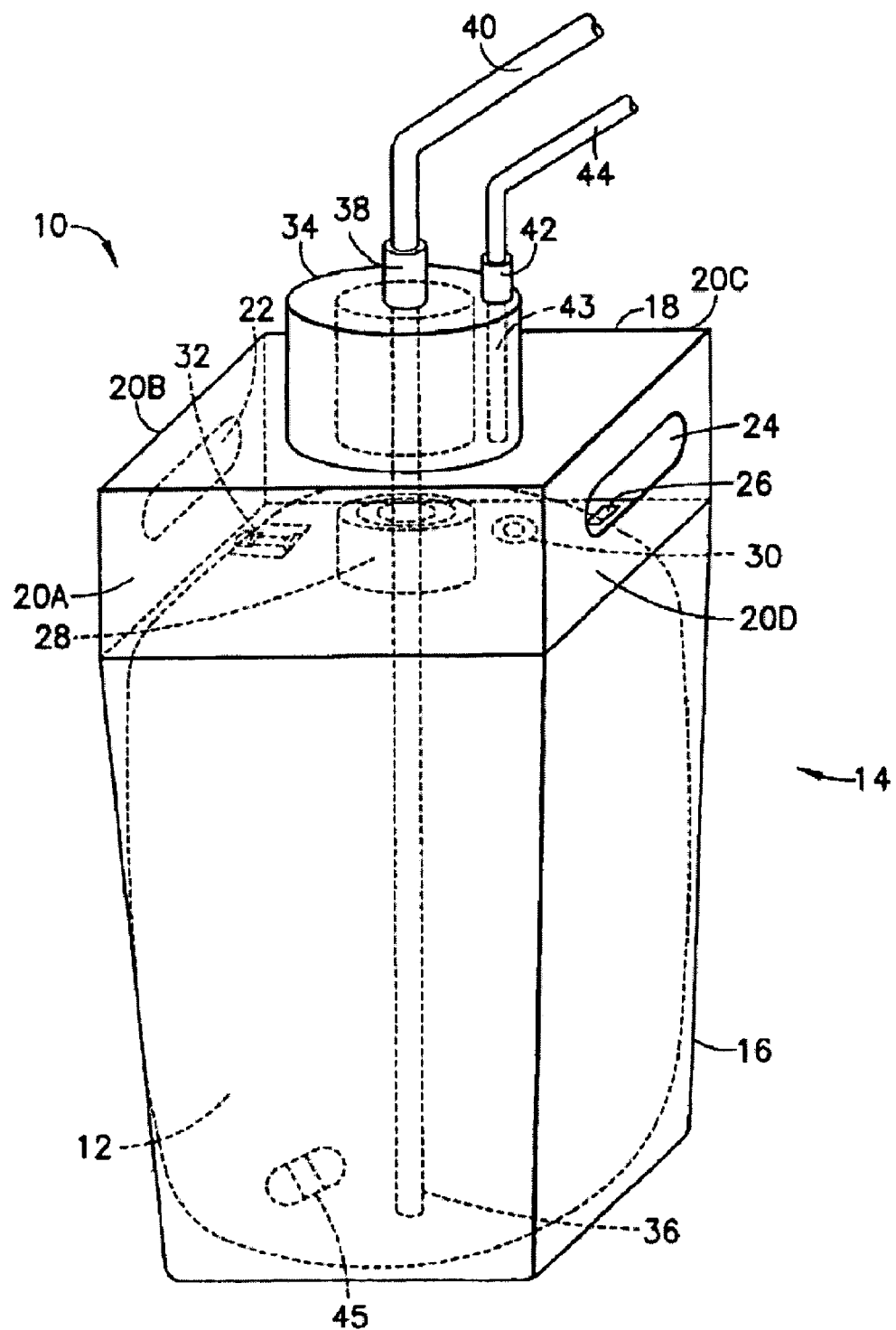
FIG. 1 is a perspective view of a fluid storage and dispensing container according to one embodiment of the invention.

FIG. 1 is a perspective view of a fluid storage and dispensing container 10 according to one embodiment of the invention. The container 10 includes a flexible, resilient liner 12 capable of holding liquid, e.g., a high purity liquid (having a purity of >99.99% by weight) in a generally rigid housing 14.

The liner 12 is a 3-dimensional, closed head liner. The 3-dimensional character of the liner means that the liner is formed from tubular stock material, as opposed to a 2-dimensional liner that typically is formed by heat-sealing superimposed flat sheet stock pieces at their superimposed edges to form the liner structure. By the use of a tubular stock, e.g., a blown tubular polymeric film material, the heat seal welded seams along the sides of the liner are avoided. The absence of side welded seams in turn provides a liner that is better able to withstand forces and pressures that tend to stress the liner and which frequently cause the failure of seams in 2-dimensional liners. The liner of the container of the present invention is advantageously of a closed head character. A closed-head liner is one that has a sealed or otherwise closed head portion, as opposed to an open head liner that is formed with a neck opening or a port opening on the head portion of the liner.

The present invention represents an advance in the art in the use of a single-use, thin membrane, 3-dimensional, closed head liner. In operation, the liner 12 is removed after each use (e.g., when the container is depleted of the liquid contained therein) and replaced with a new, pre-cleaned liner to enable the reuse of the overall container 10.

The 3-dimensional, closed head character of the liner in the container of the present invention imparts significant durability to the liner. For example, in conformance tests of the durability of the liner, it was determined that the 3-dimensional, closed liner exhibited 70-80 hours endurance, while corresponding 2-dimensional, closed liners exhibited 8-20 hours of useful performance life. The test method involved an Over the Road Shipment Simulation using a Lansmont Variable Frequency Vibration Table, which was run with liquid-filled liner containers of both types (i.e., one container holding a liquid-filled liner of the 3-dimensional, closed type, and the other container holding a liquid-filled liner of the 2-dimensional, open head type). Failure was defined as liquid leakage outside of the liner, and liners in the respective containers were inspected every 8 hours for liquid leakage. The sample sizes were the same (Sample Size 10) for the 3-dimensional liner and the 2-dimensional liner. The 3-dimensional closed-head liquid liner contained liquid for >70 hours (~80 hours typical) and the 2-dimensional closed-head liner contained the liquid contents for <20 hours (~8 hours typical).

The use of a 3-dimensional, closed-head liner in the container of the present invention is an important feature of the container of the present invention. To date, only 2-dimensional closed-head liners or 3-dimensional open-head liners have been produced, which are available only for industrial applications where purity of the contained liquid is not critical. The prior 2-dimensional closed-head liners and 3-dimensional open-head liners have typically been made of polymeric film material containing a full compliment of normal plastics additives for film products. Such conventional plastics additives include ultraviolet stabilizers, plasticizers, antioxidants, fillers, extenders, pigments, processing agents such as blowing or casting agents, etc.

As a result of the conventional use of such a multiplicity of additives in the film from which prior liners have been produced, the film components typically have provided a source of contaminants, as the additives leach into the liquid contained in the liner, or are decomposed to products that have greater diffusivity in the polymeric film and that migrate to the surface and solubilize or otherwise become contaminants of the liquid in the liner.

As a result, the prior 2-dimensional closed-head liners and 3-dimensional open head liners are not suitable for applications such as semiconductor manufacturing having high purity standards for liquid reagents, e.g., in terms of metal components and extractables from the container material of construction.

This is remedied in the practice of the invention by utilizing film stock for forming the liner, which is free of plastics additives such as those mentioned above. The invention utilizes a substantially pure film for the liner, such as virgin (additive-free) polyethylene film, virgin polytetrafluoroethylene (PTFE) film, or other suitable polymeric material. Illustrative of other alternative film materials are polypropylene, polyurethane, polyvinylidene chloride, polyvinylchloride, polyacetal, polystyrene, polyacrylonitrile, polybutylene, etc.

At present, virgin polymeric materials are utilized only for rigid containers, e.g., those having a wall thickness on the order of 0.125 inch to about 0.25 inch or even greater thickness dimensions. The film utilized in the liner of the present invention is less than such thicknesses. For example, the thickness of the film material constituting the liner in the container of the invention is advantageously in a range from about 5 mils (0.005 inch) to about 30 mils (0.030 inch), as for example a thickness of 20 mils (0.020 inch).

The 3-dimensional, closed head liner may be formed in a suitable manner, but preferably is manufactured using tubular low molding of the liner with formation of an integral fill opening at an upper end of the vessel, which may, as shown in FIG. 1, be joined to a port or cap structure 28. The liner thus may have an opening for coupling of the liner to suitable connector means for fill or dispense operations involving respective introduction or discharge of fluid. The cap joined to the liner port may be manually removable and may be variously configured, as regards the specific structure of the liner port and cap. The cap also may be arranged to couple with a diptube for introduction or dispensing of fluid in any suitable coupling manner.

The liner 12 of the container thus has a 3-dimensional, form fit shape, and is formed of a flexible film material such as virgin polyethylene, which is processable without the requirement of co-extrusion or barrier layers. The film contains no pigments, UV inhibitors or processing agents or other components that adversely affect the purity requirements for the liquid contained in the liner during use of the container for liquid storage and dispensing.

The liner 12 includes 2 ports in the top of the liner, as shown in FIG. 1. The liner is disposed in a substantially rigid housing or overpack 14, which is of a generally rectangular parallepiped shape, including a lower receptacle portion 16 for containing the liner 12 therein, and an upper stacking and transport handling section 18. The stacking and transport handling section 18 includes oppositely facing front and rear walls 20A and 20C, respectively, and oppositely facing side walls 20B and 20D, as illustrated. The oppositely facing side walls 20B and 20D have respective manual handling openings 22 and 24, respectively, to enable the container to be manually grasped, and physically lifted or otherwise transported in use of the container.

The lower receptacle portion 16 of the generally rigid housing 14 is as shown slightly tapered by an angle α relative to the vertical. The rigid housing 14 may be rectangular (e.g., square) or round in (cross-sectional) shape. In the FIG. 1 view, the taper angle α is measured as the included angle between the plane of the tapered wall surface, and the plane containing the vertical wall surface of the upper stacking and transport handling section 18 (or otherwise parallel to the central vertical axis of the container). All of the four walls of the lower receptacle portion 16 are downwardly inwardly tapered, to enable the stacking of the containers for storage and transport, as hereinafter more fully described.

The generally rigid housing 14 also includes an overpack lid 26, which is leak-tightly joined to the walls of the housing 14, to bound an interior space in the housing 14 containing the liner 12, as shown.

The liner has two rigid ports, including a main top port coupling to the cap 28 and arranged to accommodate passage therethrough of the dip tube 36 for dispensing of the liquid. The dip tube 36 is part of the dispensing assembly including the dip tube, dispensing head 34, coupling 38 and liquid dispensing tube 40. The dispensing assembly also includes a gas fill tube 44 joined to dispensing head 34 by coupling 42 and communicating with a passage 43 in the dispensing head which is leak-tightly couplable to the interior volume port 30 in the overpack lid 26, to accommodate introduction of a gas for exerting pressure against liner 12 in the dispensing operation, so that liquid contained in liner 12 is forced from the liner through the interior passage of the hollow dip tube 36 and through the dispensing assembly to the liquid dispensing tube 40.

The liner 12 thus is formed of a film material of sufficient thickness to be flexible and collapsible in character. In one preferred aspect, the liner is compressible to about 10% or less of the rated fill volume, i.e., the volume of liquid able to be contained in the liner when same is fully filled in the housing 14. Preferred liner materials thus are sufficiently pliable to allow for folding or compressing of the liner during shipment as a replacement unit. The liner preferably is of a composition and character that particle formation is suppressed when liquid is contained in the liner, and maintained at sufficiently low levels to accommodate purity requirements for semiconductor manufacturing and other high purity-critical liquid supply applications.

For semiconductor manufacturing applications, the liquid contained in the liner 12 of the container 10 should have less than 75 particles/milliliter for particles having a diameter of 0.25 microns, at the point of fill of the liner, and the liner should have less than 30 parts per billion total organic components (TOC) in the liquid, with less than 10 parts per trillion metal extractable levels per critical elements, such as calcium, cobalt, copper, chromium, iron, molybdenum, manganese, sodium, nickel, and tungsten, and with less than 150 parts per trillion iron and copper extractable levels per element for liner containment of hydrogen fluoride, hydrogen peroxide and ammonium hydroxide, consistent with the specifications set out in the Semiconductor Industry Association, International Technology Roadmap for Semiconductors (SIA, ITRS) 1999 Edition.

The liner and container should be fabricated to accommodate an integrity rating of three thousand miles highway transportation liner integrity, with a preferred performance level of no more than two failures/100,000 liner packages.

The liner 12 of the FIG. 1 container contains in its interior space a metal pellet 45, as illustrated, to aid in non-invasive magnetic stirring of the liquid contents, as an optional feature. The magnetic stirring pellet 45 may be of a conventional type as used in laboratory operations, and may be utilized with an appropriate magnetic field-exerting table, so that the container can, when reposed on the table with the liner filled with liquid, be stirred, to render the liquid homogeneous and resistant to settling. Further, such magnetic stirring capability may be employed to resolubilize components of the liquid subsequent to transit of the liquid under conditions promoting precipitation or phase separation of the liquid contents. The stirring element being remotely actuatable in such manner has the advantage that no invasive introduction of mixing means to the interior sealed liner is necessary.

The liner 12 is suitably constructed so that when filled with liquid, there is a zero-head space in the interior volume of the liner, as more fully disclosed in the aforementioned U.S. patent application Ser. No. 10/139,185 of Wayne Kelly, et al., entitled "APPARATUS AND METHOD FOR MINIMIZING THE GENERATION OF PARTICLES IN ULTRAPURE LIQUIDS" the disclosure of which hereby is incorporated herein by reference in its entirety.

By eliminating a gas/liquid (e.g., air/liquid) interface within the liner, particle generation is unexpectedly suppressed to very low levels, as described in such co-pending application, and exemplified more fully hereinafter. Further, such zero-head space liner conformation and capability enables full filling of the liner interior volume with liquid, thereby maximizing the capacity of the liner and associated container.

Thus, when the liner 12 is filled with liquid, there is probably no gas/liquid interface in the interior volume of the liner. It will be recognized that the port 30 in deck 26 of the housing 14 may be couplable with a rigid port on the liner, so that the liner is fabricated with two ports, or alternatively the liner may be fabricated so that it is ventable using a single port configuration, as described more fully in the aforementioned co-pending U.S. patent application Ser. No. 10/139,185 of Wayne Kelly, et al.

Deck 26 of the housing 14 may be formed of a same generally rigid material as the remaining structural components of the housing, such as polyethylene, polytetrafluoroethylene, polypropylene, polyurethane, polyvinylidene chloride, polyvinylchloride, polyacetal, polystyrene, polyacrylonitrile, and polybutylene.

As a further optional modification of the container 10, a radio frequency identification tag 32 may be provided on the liner, for the purpose of providing information relating to the contained liquid and/or its intended usage, as more fully described in the aforementioned U.S. patent application Ser. No. 10/139,104 of Kevin O'Dougherty, et al., entitled "LIQUID HANDLING SYSTEM WITH ELECTRONIC INFORMATION STORAGE," the disclosure which hereby is incorporated herein by reference in its entirety. The radio frequency identification tag may be arranged to provide information via a radio frequency transponder and receiver to a user or technician who can thereby ascertain the condition of the liquid in the container, its identity, source, age, intended use location and process, etc. In lieu of a radio frequency identification device, other information storage means may be employed, which is readable, and/or transmittable, by remote sensing means, such as a hand-held scanner, computer equipped with receiver means, etc.

In the FIG. 1 container the liner 12 serves as an expandable bladder inside the supporting rigid shell of housing 14. The expandable bladder-like liner eliminates the air/liquid interface while maintaining the ability of the liquid to expand due to temperature changes. Traditional rigid wall packaging must have air in the head space to allow for expansion of the liquid due to temperature increases. In this manner, the container of the present invention achieves a significant advance in the art, involving no air/liquid contact, thereby preventing or at least minimizing particle formation and agglomeration of particles that deleteriously impact the semiconductor manufacturing operation, when the liquid dispensed to a semiconductor manufacturing tool or process operation contains particulates.

In the dispensing operation involving the container 10 shown in FIG. 1, air or other gas (nitrogen, argon, etc.) may be introduced into tube 44 and through port 30 of lid 26, to exert pressure on the exterior surface of the liner, causing it to contract and force liquid through the dip tube 36 and dispensing assembly to liquid dispensing tube 40.

Correspondingly, air may be displaced from the interior volume of housing 14 through port 30, thereby flowing through the passage 43 in dispensing head 34 to tube 44 during the filling operation, so that air is displaced as the liner expands during the liquid fill thereof.

Figure 3:
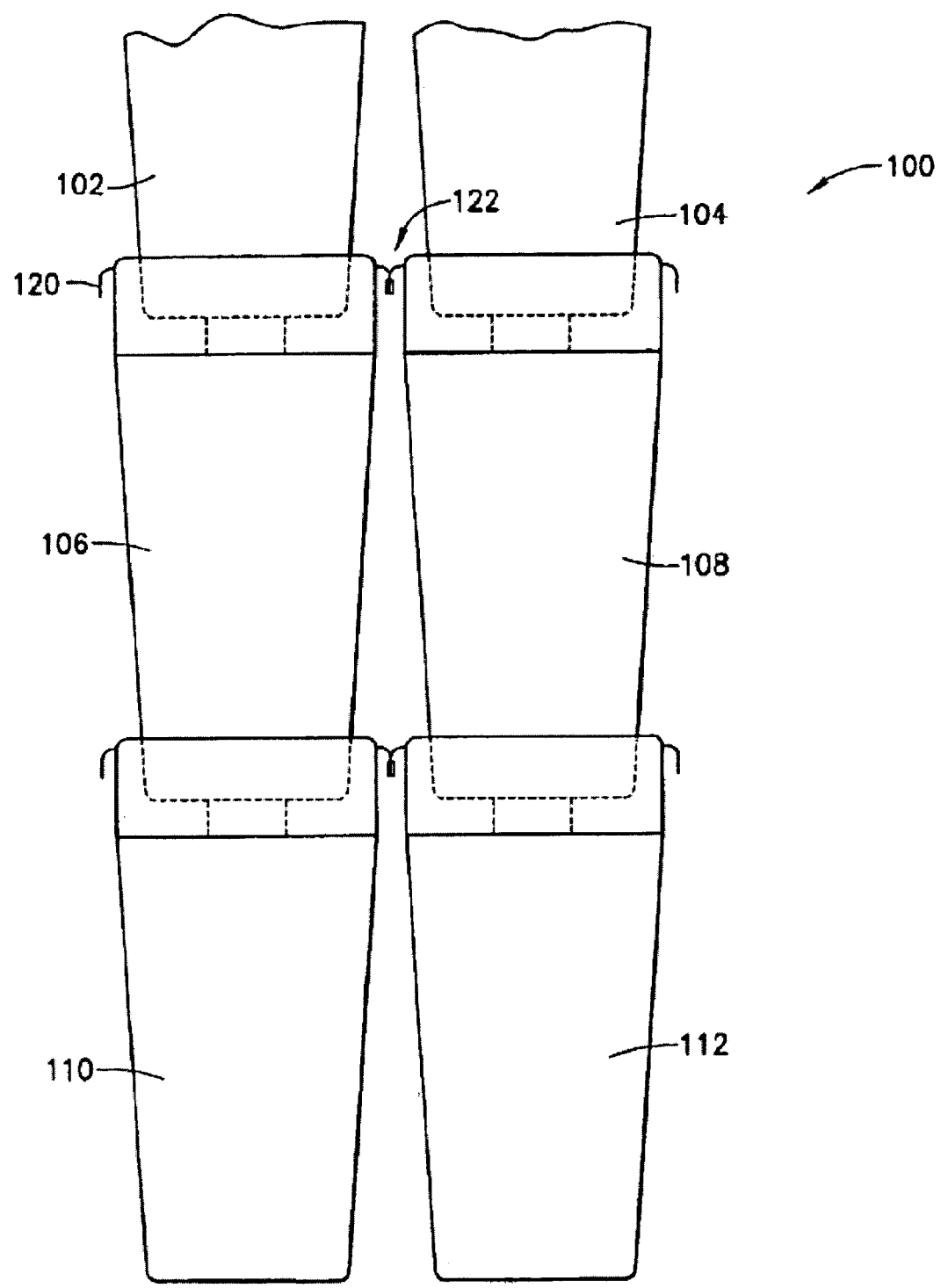
FIG. 3 is a front elevation view of an array of fluid storage and dispensing containers according to the invention, in nested and interconnected relationship, to define an arrangement for storage and transport of the containers.

The lower portion 16 of housing 14 may have tapered walls whose taper angle $\alpha$ is less than 15°, e.g., an angle between about 2 and 12°, sufficient to retain the generally parallepiped geometry of the housing, while allowing the container to be stacked in multiple container arrays, as shown in FIG. 3, described more fully hereinafter.

Figure 2:
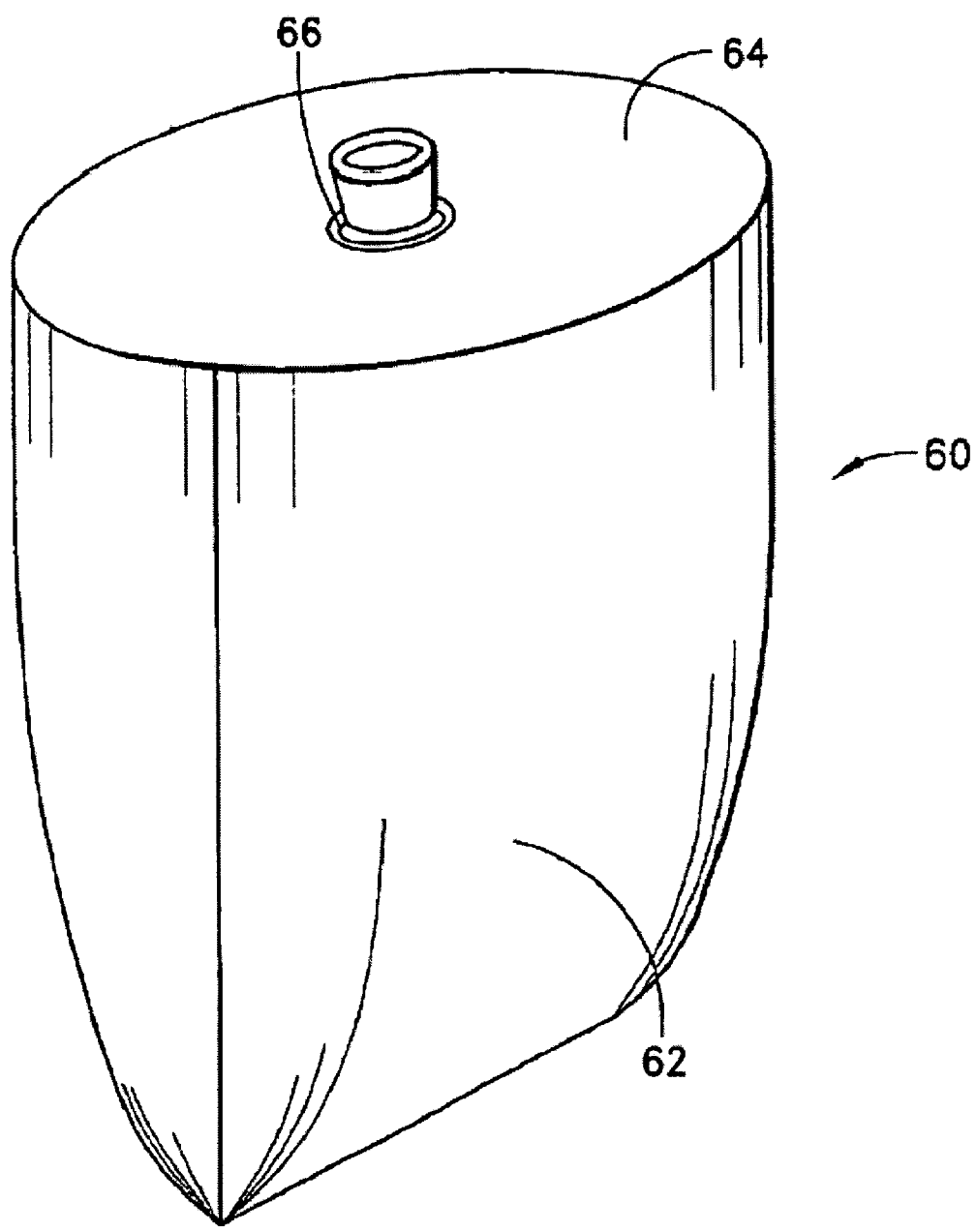
FIG. 2 is a perspective view of a three-dimensional liner according to one embodiment of the invention.

FIG. 2 is a perspective view of a three-dimensional, closed-head liner 60 according to one embodiment of the invention. The liner 60 includes a main bag body 62 formed of a blown tubular film material, such as polyethylene film. At its upper end, the main bag body 62 is joined to the head member 64 in a leak-tight fashion to provide the bag structure of the liner. The head member 64 has a central port opening 66 in the embodiment shown, in which may be disposed a cap or closure member, and a diptube for liquid dispensing from the liner when the liner is mounted in the overpack and arranged for liquid dispensing operation.

Referring now to FIG. 3, there is shown an array 100 of stacked and nested containers 102, 104, 106, 108, 110 and 112, in which the respective stacks 102, 106 and 110, shown on the left-hand portion of FIG. 2, and the vertical stack of containers 104, 108 and 112 on the right-hand portion of the figure, are vertically nested, with the lower tapered housing portion of each overlying container reposing in the upper cavity of the next-adjacent underlying container. Further, the respective containers have their upper portions equipped with intercouplable connectors 120 which are disconnectably connectable to one another to form a connected coupling 122, as shown with reference to laterally adjacent containers 106 and 108, and laterally adjacent containers 110 and 112. In such manner, the multiple containers may be laterally coupled with one another to constitute a laterally extending array of containers.

It will be recognized that the rectangular parallepiped conformation of the housing 14 in the container of the invention enables vertical stacking of the containers as well as lateral abutment of containers in laterally extending rows, whereby the containers enable an extremely efficient use of storage volume allocated to holding the fluid containers. For example, a container according to the invention, having a parallelepiped conformation, and a rated capacity of 300 liters of liquid, can be placed in the space constraints allocated to a traditional 200 liter drum.

In other words, the geometric form factor associated with the containers in the present invention enable a 50% increase in the liquid capacity of a given volumetric storage/transport facility. This in turn enables the liquid reagent storage space in a semiconductor manufacturing facility to be reduced, thereby correspondingly lowering the capital investment and operating expenses (e.g., utility costs) associated with the storage vault, tank farm or other container repository.

Alternatively, with a same-sized special volume allocated to fluid containers, substantially more capacity is enabled as regards the total liquid inventory in the containers, which in turn translates to less frequent change-outs of the inventory in terms of number of containers involved, less frequent shipments of containers for a truck or shipping container of a given size, and the amenability, by virtue of the vertical nesting capability, to utilize relatively tall stacks of containers in relation to conventional drums.

When vertically stacked with other like containers, as shown in FIG. 3, the height of the stack is less than the sum of the heights of the individual containers in the vertical stack. In one embodiment, the deck or lid of the container may be removed, and the container receptacle portions may be vertically stacked and nested with one another to form a vertically stacked array of relatively low height, e.g., substantially less than the sum of the heights of the individual containers in the vertically stacked array.

It will be recognized that the containers in the array illustrated in FIG. 3 are arranged with the lower end of the containers in the upper rows reposed on the cap/deck structure of the next lower containers vertically aligned therewith. The deck (see FIG. 1) may be arranged to fit into slots in the overpack interior structure, or to engage retention protrusions or detent elements on the inner surface of the overpack's upper portion, so that the deck overlies the head (see FIG. 2) of the liner and is in close proximity thereto.

Alternatively, containers of the type shown in FIG. 3 may be arranged after being emptied of liquid in use, with the deck members being removed, along with the liners and other wetted components, so that the containers are closely nestable with one another.

Although the fluid storage and dispensing containers in the broad practice of the invention advantageously have a parallelepiped conformation, as shown in FIG. 1, by virtue of a rectangular or cubic geometry of the overpack, the overpack size, shape and conformation may be of any suitable type.

Figure 4:
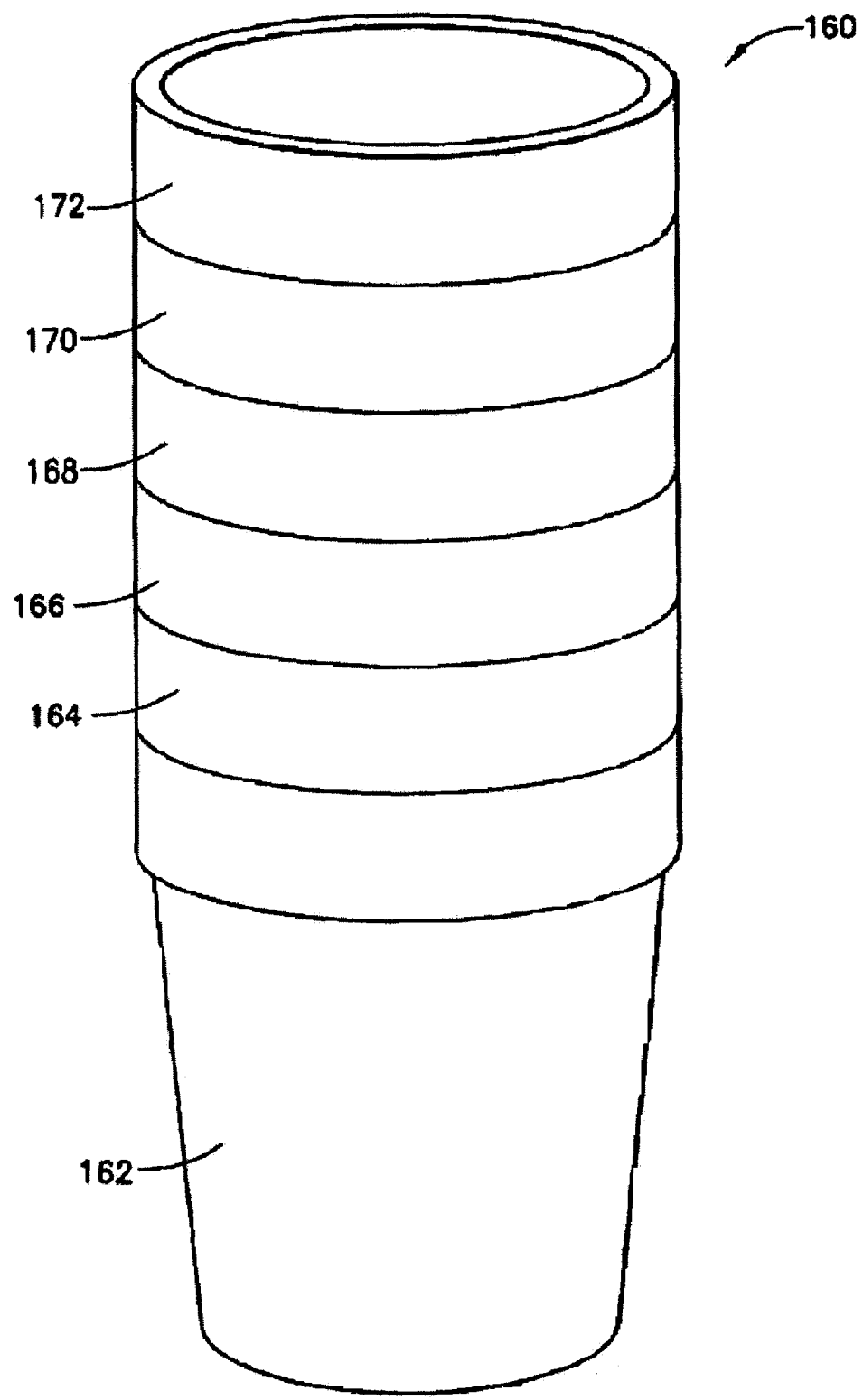
FIG. 4 is a front elevation view of an array of overpacks of fluid storage and dispensing containers according to the invention, in nested relationship, to define an arrangement for storage and transport of the nested overpack array.

For example, FIG. 4 is a front elevation view of an array 160 of overpacks 162, 164, 166, 168, 170 and 172 of fluid storage and dispensing containers according to the invention, in nested relationship, to define an arrangement for storage and transport of the nested overpack array. The overpacks illustrated have generally cylindrical shapes, with circular cross-sections transverse to the vertical axis of the associated overpack. The overpacks illustrated in FIG. 4 have generally cylindrical collar portions at their upper ends, with a downwardly and inwardly tapering body. By such arrangement, the overpacks can be vertically stacked in arrays such as that shown, to facilitate their shipment to refabrication facilities after use and removal of the liner and other wetted components from the overpack.

Figure 5:
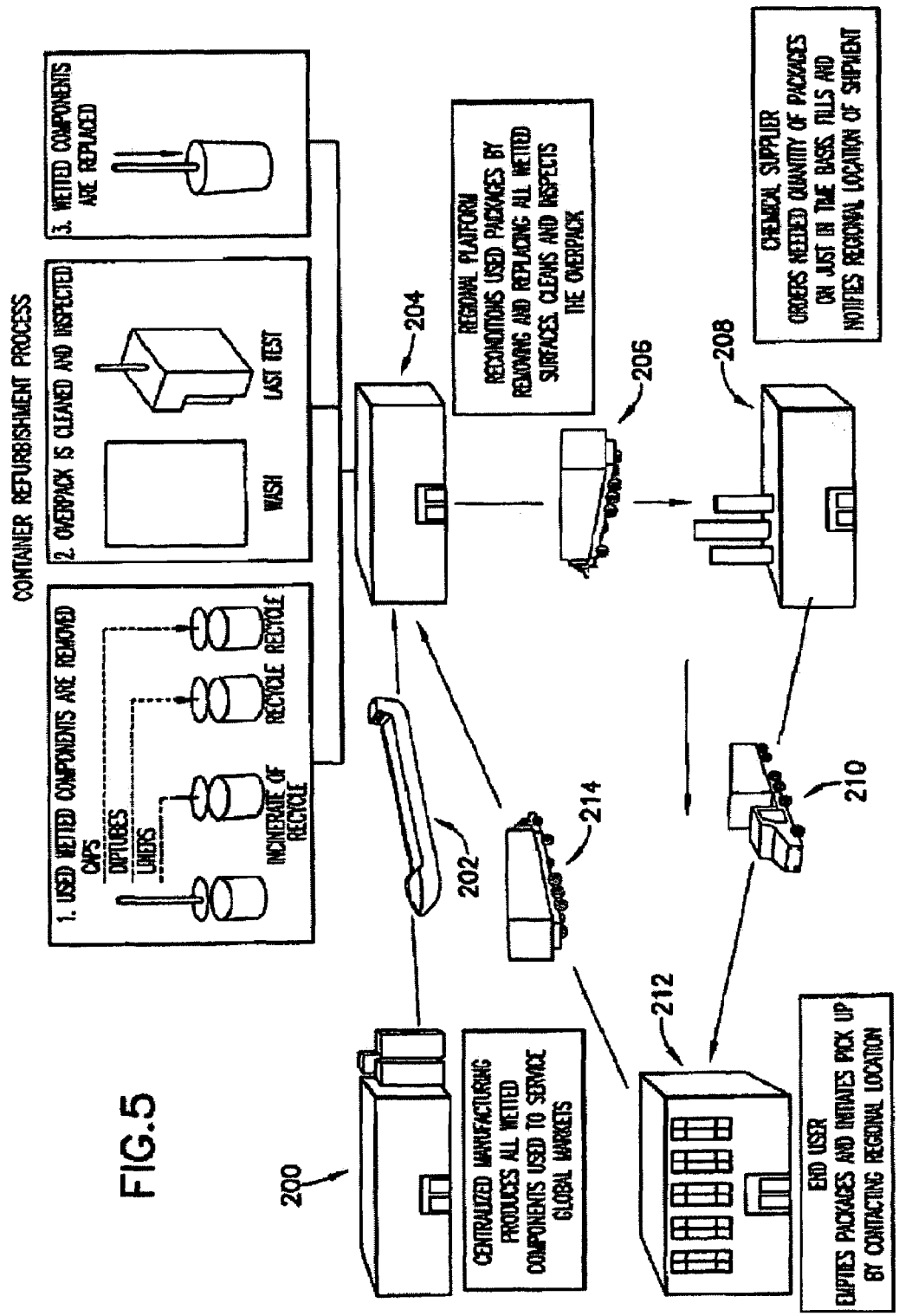
FIG. 5 is a schematic representation of a container manufacturing, use, refurbishing, and reuse system, according to an illustrative specific aspect of the invention.

FIG. 5 is a schematic representation of a container manufacturing, use, refurbishing and re-use system, according to a further aspect of the invention.

As depicted in FIG. 5, the container according to the invention, which may be of the general type shown in FIG. 1, is manufactured in a centralized manufacturing facility 200, which produces all wetted components of the container, including the liner, dip tube and cap, such components being assembled with the generally rigid housing (overpack) to constitute the container. From the manufacturing facility, the originally manufactured container is sent to the chemical supplier 208, which fills the liner of each container with the required chemical liquid. The completed liquid containers then are shipped, e.g., by truck 210 or alternatively rail, air, or marine vessel, to the end user 212. The end user may be of any suitable type, as for example a semiconductor device manufacturer in whose facility the liquid containers are joined to flow circuitry coupled to semiconductor manufacturing tools, for use of the dispensed liquid in the semiconductor manufacturing process.

Regardless of the specific character of the end use operation, the end user utilizes the container to selectively dispense liquid in its operations. The liquid is progressively, and finally completely, dispensed from the vessel, producing an emptied liner container. The end user then may remove the overpack lid from the container, in order to remove the liner for disposal and to nest the overpacks for return shipment. Overpacks are nested to minimize freight costs. The end user then contacts a regional platform operator 204, who coordinates the pick-up of the broken-down (dissembled to produce the overpack as a separate element from the previously assembled container) and nested containers.

The regional platform operator then reconditions the used containers by replacing all wetted components and reinstalling the lid into the overpack to produce a refabricated container. Specifically, the housing 14 (see FIG. 1) is cleaned and inspected, e.g., involving wash and leak testing operations, and wetted components are replaced to complete the refabricated container. The wetted components may be new or alternatively may be recycled components.

The regional platform operator 204 then ships the refabricated container by truck 206 or other mode of transportation (e.g., rail car, air freight, or marine transshipment) to chemical supplier 208, who fills the refabricated containers with liquid to begin the cycle of operation again.

Concerning the wetted components of the container (e.g., liner, dip tube and cap), the same may be processed in any of various manners, depending on the characteristics of the fabrication/fill/use/refabrication cycle of the container. For example, the wetted components may be produced as disposable components (formed of a biodegradable or recyclable polymeric film material), which are removed from the container assembly, and disposed of or recycled, by the end user. The end user may collected the liner components, caps and diptubes, etc. and provide them to the regional platform operator at the time of pick-up of the nested overpacks deriving from the emptied containers, for further processing, use or other disposition by the regional platform operator.

Alternatively, the end user could simply furnish the emptied containers to the regional platform operator in their assembled form, whereby the regional platform operator can disassemble the containers, and clean the overpacks as well as other potentially other components of the containers for reuse, in refabricating containers. Thus, the liner, dip tube and cap can be removed from the emptied container by the end user, or alternatively by the regional platform operator, or by the transporter who ships the containers from the end user's facility to the regional platform operator's facility. The liner may be incinerated (or otherwise disposed of) or recycled, as necessary or desired in a given application of the invention. The dip tubes and caps of the containers likewise may be disposed of or recycled, but in preferred practice are recycled.

Accordingly, the invention contemplates a method of supplying liquid in containers to an end user market and refabricating containers subsequent to consumption of the liquid therefrom, including the steps of:

(a) manufacturing the containers, each including an overpack and wetted components (viz., a liner for containing the liquid, having a port for transfer of fluid into or out of the liner, and a cap and diptube coupled to the port);

(b) filling the containers with liquid to provide liquid-filled containers;

(d) transporting the liquid-filled containers to end users in the end user market, where the end users use the liquid in the containers, and generate emptied containers;

(g) transporting at least the overpacks of the emptied containers to a refabrication facility, and processing same to form refabricated containers including the overpacks of the emptied containers;

(h) transporting the refabricated containers to a liquid fill facility and filling same with liquid to provide liquid-filled refabricated containers; and (i) repeating steps (c), (d) and (e) in sequence.

The recycled wetted components may be the caps and diptubes of the containers, with the refabricated containers using new disposable liners, or the recycled wetted components alternatively may be all three components (liner, cap and diptube).

In this method of supplying liquid in containers to an end user market and refabricating containers subsequent to consumption of the contained liquid, the liquid fill facility and the refabrication facility can be integrated operations of a single location enterprise, or they can be geographically separated operations. The end use of the liquid supplied in the containers may be semiconductor manufacturing, or other process application. In the case of semiconductor manufacturing operations, the liquids supplied to the end user in the containers may be of widely varying types, including for example semiconductor manufacturing reagents such as acids, solvents, bases, photoresists, dopants, metalorganic reagents, silicon source compounds, and chemical mechanical planarization (CMP) compositions.

By the methodology depicted in FIG. 5 of reusing and refabricating container housings, and recycling dip tubes, caps and optionally liners of the container, a substantial benefit in cost of chemical reagents is realized, in addition to environmental benefits associated with reduced levels of disposables for chemical reagents, and the ability to provide localized container refurbishing operations in geographic proximity to end users, so that a local or regional operation is economically facilitated.

Figure 6:
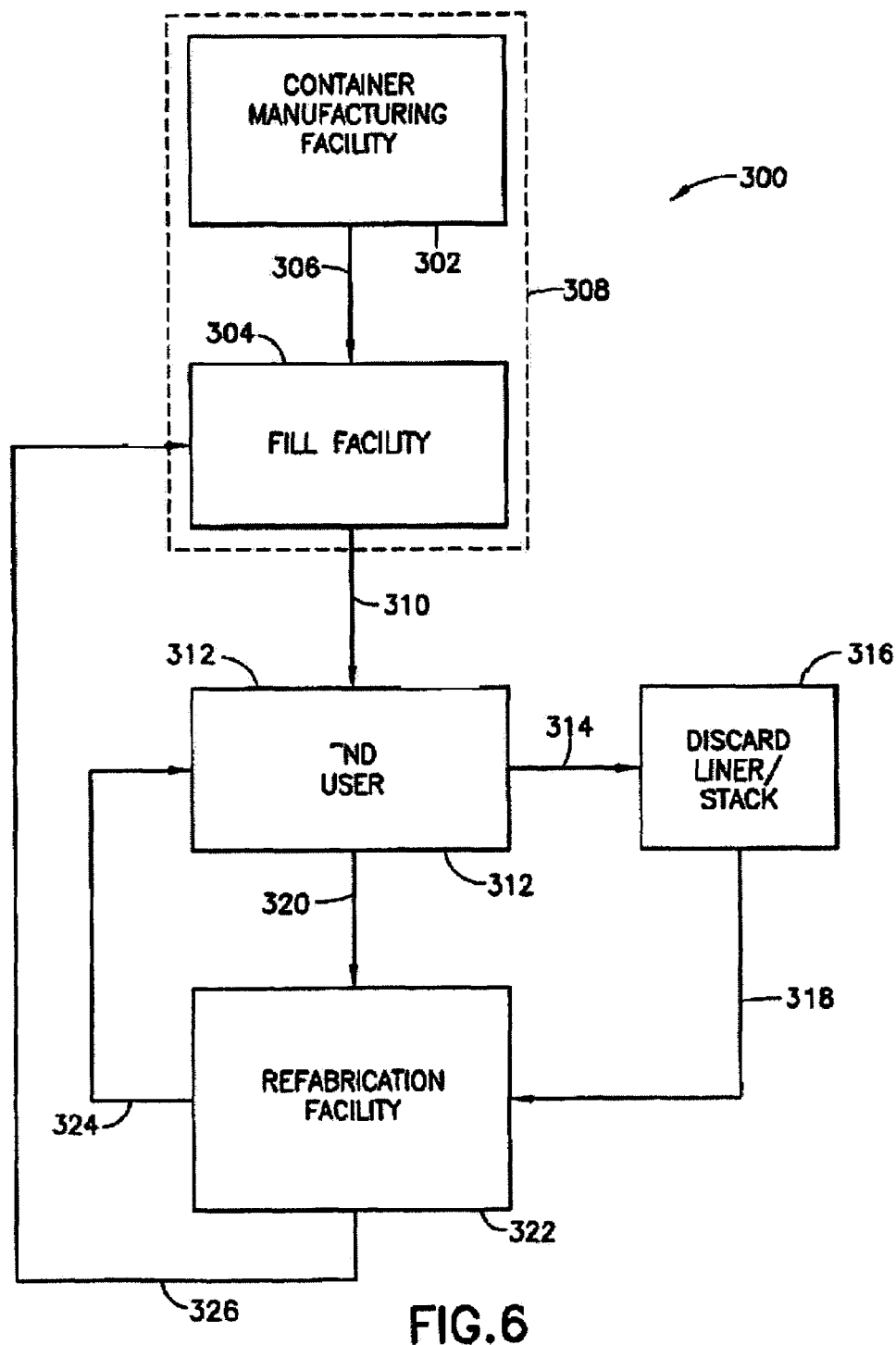
FIG. 6 is a generalized schematic flowchart of an integrated fluid supply system, using fluid storage and dispensing containers according to the invention.

FIG. 6 is a generalized schematic flowchart of an integrated fluid supply system 300, using fluid storage and dispensing containers according to the invention.

In the FIG. 6 flowchart, the container manufacturing facility 302 manufactures the container. The facility may be an original equipment manufacturing facility, or an assembly plant in which the overpacks, liners, caps, diptubes, deck members, etc., sourced from different suppliers, are constructed into the finished containers. In any event, the finished container then is transported (by transport means schematically indicated by arrow 306) to the fill facility 304.

In the fill facility 304, the containers are filled with the fluid or other material to be dispensed in use of the containers. The fluid may for example be a liquid chemical reagent for an industrial process application. The fill facility 304 may be consolidated with the container manufacturing facility 302 in a unitary container manufacturing and fill facility 308 as represented in dotted outline in FIG. 6. In such consolidated facility 308, the transport means 306 may include a conveyor belt, forklift, assembly line cable, manually moveable bin, dolly or other local transport means, rather than transport means such as rail, aircraft, trucking, marine shipping or other long-haul transport means as used when the container manufacturing facility 302 and the fill facility 304 are not in geographic proximity to one another.

Once the containers are filled in the fill facility 304, they are transported by transport means schematically depicted by arrow 310 (which means may comprise the transport craft or vehicles previously discussed herein) to the end user 312. The end user may comprise an industrial process, manufacturing process facility, or other locus or application, in which the container holding liquid in the liner is utilized as a supply vessel for the liquid, from which the liquid is selectively dispensed for its ultimate use.

The end user 312 may after emptying the container of its liquid inventory transport the empty container, by transport means schematically represented in FIG. 6 by arrow 314 to a disassembly location 316, in which the container is disassembled. The liner then is removed from the overpack of the container and discarded, and the overpack structures from multiple emptied and disassembled containers may be stacked for transport. The stacked overpacks are transported by transport means, represented schematically by arrow 318 in FIG. 6, to the refabrication facility 322.

Alternatively, the end user 312 may in lieu of disassembling the container at the disassembly location 316, transport the empty but still assembled container by transport means schematically represented in FIG. 6 by arrow 320, to the refabrication facility 322. As a still further alternative, the container may be only partially disassembled and then shipped or otherwise transported to the refabrication facility 322.

The refabrication facility 322 may therefore receive the at least partial containers for the refabrication processing, in which the overpacks are cleaned, inspected, and then constructed, together with wettable components, into remanufactured containers suitable for new use. The refabrication facility 322 may be constituted as a refabrication facility for the containers, and a disposal or reclaiming facility for wettable components of previously used containers. Thus, as mentioned, the liners of used containers may be incinerated or otherwise be disposed of, or the liners may be cleaned and then used as recycle stock for blow molding of new liners. The diptubes and caps may be cleaned and sterilized, and subsequently be introduced to the fabrication process to form refabricated containers.

In any event, the finally refabricated container then may be transported by transport means schematically represented in FIG. 6 by arrow 326 to the fill facility 304 for filling of the liner of the container with fresh fluid to be stored in and dispensed from the container. Alternatively, the refabricated container may be transported by transport means schematically represented in FIG. 6 by arrow 324 directly to the end user 312, if the refabrication facility also incorporates fluid fill capability, as for example a liquid fill station in the refabrication plant.

It will therefore be appreciated that the containers of the invention are of a form that readily enables their manufacturing, filling, use and refabrication, as part of a distribution and reclaiming network that can be variously implemented to link manufacturers, material suppliers, material users, shippers, and reclaiming facilities in an integrated manner, e.g., for achieving economies of scale and minimizing environmental impact of materials such as semiconductor manufacturing liquid chemicals.

It will also be recognized that the container illustratively shown in FIG. 1 may be variously modified, as regards to the structural features, components and means and methods of filling and dispensing. For example, in place of a radio frequency identification tag 32, such as microelectronic read-write element, other types of microcircuitry, e.g., "smart chips," may be embedded in the housing 14 rather than the liner, or may be positioned on a surface of the liner or the housing. For example, a chip or microelectronic tag may be mounted on or embedded in the deck 26 overlying the liner for monitoring of liquid level, temperature, etc., or such chip or tag may be mounted on or embedded in one of the side walls, or alternatively the floor of the housing 14.

The containers may be laterally coupled with one another by any suitable interconnection means, such as hook and loop fasteners, mechanical fasteners, belting or lapping structures, etc. Further, the upper portion of the housing may be provided with locking structure on the cap or deck that is complimentarily matable with corresponding coupling structure on the bottom surface of the housing floor. For such purpose, the floor may be concavely molded or otherwise formed, so as to enable such interconnection, so that a vertically stacked array of the containers is rigidified and rendered structurally stable even when stacked to very high heights.

In another embodiment, the upper portion of the housing 14 may include a removable deck or lid 26, so that nesting is accommodated with substantial penetration of an overlying container tapered portion into an underlying container interior volume, such that additional stabilization is not necessary for the stacked array, or so that a multiple housing stack can be secured for shipment or storage as a unitary body due to the deeply nested character of the constituent housing units. Nesting of the container housings results in a proportional reduction in return freight costs of the emptied containers.

The container of the invention is of particular utility for storage and dispensing of compositions for chemical mechanical planarization (CMP), especially when the zero headspace configuration of the container is employed. CMP compositions are adversely affected by the presence of air and entrainment/solubilization of air in the composition, which causes a high extent of agglomeration of particles from the slurry or suspension of the composition, and adversely affects the utility of the composition for effective polishing and planarization of microelectronic device structures. By use of the zero headspace conformation of the container, the air/liquid interface is correspondingly eliminated, and the adverse effect of air in promoting particle formation is avoided.

The features and advantages of the invention are more fully shown with respect to the following example, which is not to be limitingly construed, as regards to the character and scope of the present invention, but is intended merely to illustrate a specific preferred aspect useful in the broad practice of the present invention.

EXAMPLE 1

From the same lot of Oxide Slurry OS-70KL material (ATMI Materials Lifecycle Solutions, Danbury, Conn.) several different sample vials were made up, containing the OS-70KL material, to simulate behavior of the liquid in a bag in a drum container of the type generally shown and described with reference to FIG. 1, with varying headspace in the interior volume of the liner.

The sample vials were made up with the following differing headspace levels: 0%, 2%, 5% and 10%. Each of the sample vials was vigorously shaken for one minute by hand, and the liquid in the vial was then subjected to analysis in an Accusizer 780 Single Particle Optical Sizer, a size range particle counter commercially available from Sci-Tec Inc. (Santa Barbara, Calif.), which obtains particle counts in particle size ranges that can then be "binned" algorithmically into broad particle distributions.

The data obtained in this experiment are shown in Table 1 below. The particle counts are shown for each of the particle sizes 0.57 µm, 0.98 µm, 1.98 µm and 9.99 µm, at the various headspace percentage values of 0%, 2%, 5% and 10% headspace volume (expressed as a percentage of the total interior volume occupied by the air volume above the liquid constituting the headspace void volume).

TABLE 1

Size Range Particle Counts for Varying Headspace Volumes in Sample Vials

| Average Particle Size for Range | Initial Particle Count Before Shaking | Particle Count - 0% Headspace | Particle Count - 2% Headspace | Particle Count - 5% Headspace | Particle Count - 10% Headspace |
|---|---|---|---|---|---|
| Size Range Particle Counts Immediately After Shaking Vial for One Minute | | | | | |
| 0.57 µm | 170,617 | 609,991 | 134,582 | 144,703 | 159,082 |
| 0.98 µm | 13,726 | 14,836 | 22,096 | 20,294 | 26,429 |
| 1.98 µm | 2,704 | 2,900 | 5,298 | 4,397 | 6,293 |
| 9.98 µm | 296 | 321 | 469 | 453 | 529 |
| Size Range Particle Counts 24 Hours After Shaking Vial for One Minute | | | | | |
| 0.57 µm | 110,771 | 1,198,296 | 191,188 | 186,847 | 182,217 |
| 0.98 µm | 11,720 | 18,137 | 21,349 | 20,296 | 24,472 |
| 1.98 µm | 2,701 | 2,383 | 4,658 | 4,272 | 5,704 |
| 9.98 µm | 138 | 273 | 544 | 736 | 571 |

The particle size analyzer presented the data in terms of large-size particle counts, in units of particles per milliliter>a specific particle size in micrometers (µm). The particle count data has been determined to provide a direct correlation between the magnitude of the particle count and wafer defectivity when the reagent containing such particle concentration is employed for manufacturing microelectronic devices on semiconductor wafers.

The data taken immediately after the shaking experiment show some trending toward larger particle counts with increasing headspace values, particularly for particles ≧0.98 µm. Data taken 24 hours later show the same trending toward higher particle distributions.

The data show that increasing headspace in the vial produced increasing aggregations of large size particles, which are deleterious in semiconductor manufacturing applications and can ruin integrated circuitry or render devices formed on the wafer grossly deficient for their intended purpose.

As applied to bag in a drum containers of the type shown and described with respect to FIG. 1 hereof, the results of this Example indicate the value of the preferred zero headspace arrangement. Any significant headspace in the container holding high purity liquid, combined with movement of the container incident to its transport, producing corresponding movement, e.g., sloshing, of the contained liquid, will produce undesirable particle concentrations. Therefore, to minimize the formation of particles in the contained liquid, the headspace should be correspondingly minimized to as close to a zero headspace condition as possible.

In a preferred illustrative embodiment, the container of the invention may comprise a 300 liter liquid capacity liner of a 3-dimensional form fit shape, blow molded from virgin polyethylene containing no pigments, UV inhibitors or other processing agents or additives, with a film thickness of the virgin polyethylene in a range of 0.018 to 0.025 inch thickness. The liner has two rigid ports in the top of the liner. The ports are configured to lock the liner into the overpack lid, hold the diptube and engage with the dispense connector that is coupled to the container for dispensing of the liquid. The liner can include one or two port openings.

The liner is of a pliable character, being compressible to 10% of its rated fill volume, to enable folding or compressing the liner for shipment as a replacement unit for refurbishing the container after a preceding use, as described hereinabove in connection with FIG. 3 hereof. The liner is designed and constructed to eliminate the headspace after filling of the liner with liquid.

The outer, substantially rigid housing, or overpack, of the container in such preferred embodiment is 39 inches (990 mm) in height, and 23.25 inches (590 mm) in width, as maximum dimensions. The overpack is of an open head design, and is formed of polyethylene, having a custom lid with the capability to include one or two ports. The minimum wall thickness of the overpack is 0.197 inch (5 mm). The overpack drum body is nestable, without the top portion of the overpack, and can be vertically stacked to a height of 10 units, equivalent to the height of two non-nested units. The containers are stackable to a height of three units after filling. The container may optionally employ an integral chime design, to eliminate the potential for the chime to come off during container handling, with drain holes in the top chime.

The container closure elements are 2-inch diameter caps, with a protective overcap to provide for a tamper evidence feature, and to prevent contamination of the hermetic seal plug of the container. The closure may optionally be vented, as well as being non-threaded, and may utilize integral quick connect members on the container to accommodate closure of the container contents.

The diptube of the container is formed of polyethylene or PTFE. A reusable read/write chip is integrated into the overpack or lid of the container. The read/write capability is used to track and identify the overpack chemical type(s), number of fill cycles, chemical fillers and end users and to provide inventory management capabilities such as auto-updating of a monitoring system with container status, total number of units onsite and available number of units by status level (e.g., received, broken down, cleaned and refurbished).

Connectors used to interface the container for fill and dispensing may be threaded or non-threaded in character, and may utilize quick-connect couplings, and may utilize integral shut-off arrangements at the container to prevent introduction of extraneous materials into the container without a specific fill connector. The connector may be coded with key codes to ensure proper coupling to a fill or dispense connector.

Although the invention has been variously disclosed herein with reference to illustrative embodiments and features, it will be appreciated that the embodiments and features described hereinabove are not intended to limit the invention, and that other variations, modifications and other embodiments will suggest themselves to those of ordinary skill in the art. The invention therefore is to be broadly construed, consistent with the claims hereafter set forth.

What is claimed is:

1. A container adapted for pressurized dispensation of a liquid and containing said liquid, the container comprising:
   a collapsible liner comprising a flexible polymeric film material, a first rigid port affixed to the film material and defining a first aperture, and a second rigid port affixed to the film material and defining a second aperture;
   a housing adapted to contain the collapsible liner, said housing defining at least a first orifice adapted to receive any of the first rigid port and the second rigid port, wherein the housing and liner define a sealable first volume therebetween, and wherein the housing is more rigid than the liner; and
   a gas feed passage coupleable to a source of pressurized gas to pressurize the first volume during dispensing operations;
   wherein said liquid comprises a semiconductor manufacturing liquid reagent and is contained within the liner.

2. The container of claim 1, wherein the polymeric film material is formed of a virgin polymeric film material.

3. The container of claim 2, wherein the virgin polymeric film material has a thickness in a range of from about 0.005 inch to about 0.030 inch.

4. The container of claim 1, wherein at least one of the first rigid port and the second rigid port is adapted to couple the liner with a connector having a liquid flow passage defined therein.

5. The container of claim 1, further comprising a dip tube coupled to the first port opening and extending into a second volume defined by the polymeric film material.

6. The container of claim 1, wherein the liquid has a purity of greater than 99.99% by weight.

7. The container of claim 1, wherein the semiconductor manufacturing liquid reagent comprises a material selected from the group consisting of acids, solvents, bases, photoresists, dopants, metalorganic reagents, silicon source compounds, and chemical mechanical planarization compositions.

8. The container of claim 1, wherein the liner is formed from tubular stock polymeric film material.

9. The container of claim 1, wherein said liner is free of heat seal welded seams along the sides of said liner.

10. The container of claim 1, being free of plastic additives.

11. The container of claim 1, being free of ultraviolet stabilizers, plasticizers, antioxidants, fillers, extenders, pigments and processing agents.

12. The container of claim 1, wherein the collapsible liner defines a second volume, and the container further comprises a dispense connector having a dip tube insertable through any of the first rigid port and the second rigid port into the second volume.

13. The container of claim 12, wherein the dispense connector is adapted to engage the container.

14. The container of claim 12, wherein the dispense connector defines the gas feed passage.

15. The container of claim 1, wherein the container comprises a dispense connector adapted to matably engage any of the first rigid port, the second rigid port, and a portion of the container adjacent to the first rigid port or the second rigid port, wherein the connector defines a the gas feed passage and a liquid passage adapted to permit flow of the liquid therethough during dispensing operation.

16. A semiconductor processing system comprising:
a semiconductor processing tool; and
a container adapted for pressurized dispensation of a semiconductor manufacturing liquid reagent coupled in fluid supply relationship to said semiconductor processing tool, the container comprising:
 (i) a collapsible liner comprising a flexible polymeric film material, a first rigid port affixed to the film material and defining a first aperture, and a second rigid port affixed to the film material and defining a second aperture;
 (ii) a housing adapted to contain the collapsible liner, said housing defining at least a first orifice adapted to receive any of the first rigid port and the second rigid port, wherein the housing and liner define a sealable first volume therebetween, and wherein the housing is more rigid than the liner; and
 (iii) a gas feed passage coupleable to a source of pressurized gas to pressurize the first volume during dispensing operation;
wherein:
 the collapsible liner defines a second volume; and
 the container further comprises a dispense connector having a dip tube insertable through any of the first rigid port and the second rigid port into the second volume, with the dispense connector defining the gas feed passage.

17. A container adapted for pressurized dispensation of a liquid, the container comprising:
a collapsible liner comprising a flexible polymeric film material, a first rigid port affixed to the film material and defining a first aperture, and a second rigid port affixed to the film material and defining a second aperture;
a housing adapted to contain the collapsible liner, said housing defining at least a first orifice adapted to receive any of the first rigid port and the second rigid port, wherein the housing and liner define a sealable first volume therebetween, and wherein the housing is more rigid than the liner; and
a gas feed passage coupleable to a source of pressurized gas to pressurize the first volume during dispensing operation;
wherein:
 the collapsible liner defines a second volume;
 the container further comprises a dispense connector having a dip tube insertable through any of the first rigid port and the second rigid port into the second volume, with the dispense connector defining the gas feed passage.

18. The container of claim 17, wherein the second volume is closed except for the presence of the first rigid port and the second rigid port.

19. The container of claim 17, wherein the liner is three-dimensional.

20. The container of claim 17, wherein at least one of the first rigid port and second rigid port is adapted to lock the liner to a portion of the housing proximate to the at least one orifice.

21. The container of claim 17, further comprising any of a first cap coupled to the first rigid port and a second cap coupled to the second rigid port.

22. The container of claim 17, further comprising said liquid contained within the liner.

23. The container of claim 17, wherein the liquid comprises a semiconductor manufacturing liquid reagent.

24. The container of claim 17, wherein the polymeric film material comprises any of polyethylene, polytetrafluoroethylene, polypropylene, polyurethane, polyvinylidene chloride, polyvinylchloride, polyacetal. polystyrene, polyacrylonitrile, and polybutylene.

25. The container of claim 17, wherein the polymeric film material comprises any of virgin polyethylene and virgin polytetrafluoroethylene.

26. The container of claim 17, adapted to prevent infiltration of gas into the second volume.

27. The container of claim 17, being collapsible to ten percent of the second volume.

28. The container of claim 17, wherein each of the first rigid port and the second rigid port is disposed along a first upper end of the liner.

29. The container of claim 17, wherein the housing comprises a removable or openable lid.

30. The container of claim 17, wherein the housing comprises a polymeric material.

31. The container of claim 17, wherein the polymeric film material is formed of a virgin polymeric film material.

32. The container of claim 31, wherein the virgin polymeric film material has a thickness in a range of from about 0.005 inch to about 0.030 inch.

33. The container of claim 17, wherein the liner is formed from tubular stock polymeric film material.

34. The container of claim 33, wherein said liner is free of heat seal welded seams along the sides of said liner.

* * * * *

UNITED STATES PATENT AND TRADEMARK OFFICE
CERTIFICATE OF CORRECTION

PATENT NO. : 7,316,329 B2  Page 1 of 1
APPLICATION NO. : 11/225409
DATED : January 8, 2008
INVENTOR(S) : Richard Wertenberger It is certified that error appears in the above-identified patent and that said Letters Patent is hereby corrected as shown below:

Column 14, line 55: "milliliter>a specific" should be -- milliliter > a specific --.

Signed and Sealed this

Twenty-ninth Day of April, 2008

JON W. DUDAS
*Director of the United States Patent and Trademark Office*